United States Patent
Reed

(10) Patent No.: US 9,534,175 B2
(45) Date of Patent: *Jan. 3, 2017

(54) PYROLYSIS SYSTEMS

(71) Applicant: Frank Reed, Paso Robles, CA (US)

(72) Inventor: Frank Reed, Paso Robles, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/196,645

(22) Filed: Jun. 29, 2016

(65) Prior Publication Data

US 2016/0304786 A1    Oct. 20, 2016

Related U.S. Application Data

(63) Continuation of application No. 14/105,832, filed on Dec. 13, 2013, now Pat. No. 9,394,484.

(51) Int. Cl.
| | |
|---|---|
| *C10B 7/10* | (2006.01) |
| *C10B 53/07* | (2006.01) |
| *C10K 3/06* | (2006.01) |
| *C10B 27/06* | (2006.01) |
| *C01B 3/02* | (2006.01) |

(52) U.S. Cl.
CPC .............. *C10B 53/07* (2013.01); *C01B 3/02* (2013.01); *C10B 7/10* (2013.01); *C10B 27/06* (2013.01); *C10K 3/06* (2013.01)

(58) Field of Classification Search
CPC .................. F23G 2900/50201; F23G 5/00
See application file for complete search history.

(56) References Cited

U.S. PATENT DOCUMENTS

| | | | | |
|---|---|---|---|---|
| 4,347,119 A * | 8/1982 | Thomas | .................... | C10B 7/00 201/15 |
| 4,359,951 A * | 11/1982 | Dauvergne | .............. | F01K 15/02 110/234 |
| 5,523,060 A * | 6/1996 | Hogan | .................. | B09B 3/0091 202/118 |
| 6,039,774 A * | 3/2000 | McMullen | .............. | C01B 31/08 202/100 |
| 6,758,150 B2 * | 7/2004 | Ballantine | ................ | C10B 47/44 110/110 |
| 7,032,525 B1 * | 4/2006 | Edmondson | ............ | F23G 5/027 110/118 |
| 9,394,484 B2 * | 7/2016 | Reed | ......................... | C10K 3/06 |
| 2008/0223268 A1 * | 9/2008 | Gehring | .................. | F23G 5/027 110/336 |
| 2010/0229768 A1 * | 9/2010 | Enders | .................... | F23B 10/00 110/188 |
| 2013/0034817 A1 * | 2/2013 | Rummelhoff | .......... | F23C 7/002 431/354 |

* cited by examiner

*Primary Examiner* — Matthew Merkling
(74) *Attorney, Agent, or Firm* — Leber IP Law

(57) ABSTRACT

Systems and methods are disclosed for pyrolysis of waste feed material. Some systems include a main retort and a secondary retort. Syngas is produced by pyrolysis in the main retort, and is then mixed with combustion air and ignited, in some cases to produce energy. Carbon char travels to the secondary retort and is exhausted from the system through an airlock.

12 Claims, 2 Drawing Sheets

PYROLYSIS SYSTEMS

RELATED APPLICATION

This application is a continuation application of U.S. application Ser. No. 14/105,832, filed Dec. 13, 2013, the entire contents of which is hereby incorporated by reference.

FIELD OF INVENTION

The present invention relates to systems and methods for pyrolyzing waste materials and recovering heat from the pyrolysis process.

BACKGROUND

Waste materials present ever-increasing disposal problems.

In the past, refuse and toxic waste were often burned. However, due to increased governmental and regulatory standards, the potential public health impacts of carcinogenic air emissions, such as dioxins and furans, and the risks of spreading toxic plumes, the burning of wastes has generally been abandoned.

Efforts have been made to replace burning of waste with pyrolysis processes that would provide for safe combustion with minimal emissions and allow recovery of heat from combustion.

U.S. Pat. No. 6,758,150, the full disclosure of which is incorporated herein by reference, describes a system for pyrolysis of waste material. The system includes a pyrolysis unit, a thermal oxidizer unit, and a stack unit. The pyrolysis unit includes a first retort disposed within a combustion chamber and a second retort disposed outside the combustion chamber. The combustion chamber supplies heat, which pyrolyzes the waste material as it is conveyed through the first retort. The thermal oxidizer oxidizes pyrolysis gases from the first retort and the stack unit provides a draft to move the pyrolysis gases through the thermal oxidizer. Flue gases from the combustion chamber are vented to atmosphere.

SUMMARY

The present disclosure features improved pyrolysis units for use in pyrolysis systems that include a pyrolysis unit, a thermal oxidizer unit, and a stack unit, e.g., of the type described in U.S. Pat. No. 6,758,150. As discussed above, in the pyrolysis systems disclosed herein, syngas is exhausted from the pyrolysis unit in a manner that prevents formation of clinkers in the exhaust duct, and flue gases are discharged from the pyrolysis unit in a manner that recovers their heat and eliminates discharge of flue gas to the environment. These and other features of the pyrolysis units enhances their viability for use in commercial processes and may increase energy yield from pyrolysis systems including the pyrolysis units.

In one aspect, the invention features a pyrolysis device comprising (a) a combustion chamber containing one or more burners configured to generate hot flue gases; (b) a main retort, disposed within the combustion chamber, configured to at least partially pyrolyze a feedstock delivered to the retort, thereby generating syngas; and (c) a mixing chamber, into which the syngas and flue gases flow.

Some implementations may include one or more of the following features.

The device may further include (d) a flue gas relief duct having a first end in sealing fluid communication with the combustion chamber and a second end in fluid communication with the mixing chamber; and (e) disposed within the flue gas relief duct, a syngas relief duct having a first end in fluid communication with the main retort and a second end in fluid communication with the mixing chamber. In some implementations, during use, the temperature of the gases within the flue gas relief duct and the syngas relief duct is within +/−25 degrees F. of the temperature of the flue gas and syngas in the combustion chamber and main retort, respectively. The clearance between an outer wall of the syngas relief duct and an inner wall of the flue gas relief duct may be selected such that the flow rate of the gases during use is about 30 to 60 feet/second.

In some cases, a long axis of the syngas relief duct is disposed generally perpendicular to a horizontal plane taken through a long axis of the main retort. The long axis of the flue gas relief duct is preferably also disposed generally perpendicular to the horizontal plane, in which case the long axes of the two ducts may be generally colinear.

The device may further include a mixing baffle and distribution cone within the mixing chamber, configured to direct gas outwardly within the mixing chamber. The device may also include a combustion gas inlet and an afterburner element positioned downstream of the distribution cone.

The device may also include a thermal oxidizer chamber in fluid communication with the mixing chamber, and an afterburner system disposed within the thermal oxidizer chamber, and, in some cases, an expansion chamber in fluid communication with the thermal oxidizer chamber. A plurality of mixing baffles may be disposed within the expansion chamber. A blower may be disposed downstream of the expansion chamber, the blower being configured to draw a vacuum on the expansion chamber, thermal oxidizer chamber, and mixing chamber.

The device may also include a secondary retort in fluid communication with the retort and configured to receive solid residues from the main retort. The secondary retort is preferably mounted on expansion rollers to allow relative movement of the main retort and secondary retort. This mounting technique allows the secondary retort and main retort to be connected by a rigid conduit.

In another aspect, the invention features methods of utilizing the devices disclosed herein. For example, the invention features a method comprising (a) delivering a feedstock to a main retort that is disposed within a combustion chamber containing one or more burners; (b) utilizing the burners to generate hot flue gases and thereby at least partially pyrolyze the feedstock, generating syngas; and (c) drawing the flue gases and syngas into a mixing chamber by applying a negative pressure to the main retort and combustion chamber.

Some implementations of the method may include one or more of the following features.

The method may further include (d) exhausting the flue gases from the combustion chamber through a flue gas relief duct having a first end in sealing fluid communication with the combustion chamber and a second end in fluid communication with the mixing chamber; and (e) exhausting the syngas from the main retort through a syngas relief duct disposed within the flue gas relief duct, the syngas relief duct having a first end in fluid communication with the main retort and a second end in fluid communication with the mixing chamber.

DETAILED DESCRIPTION

Figure 1:
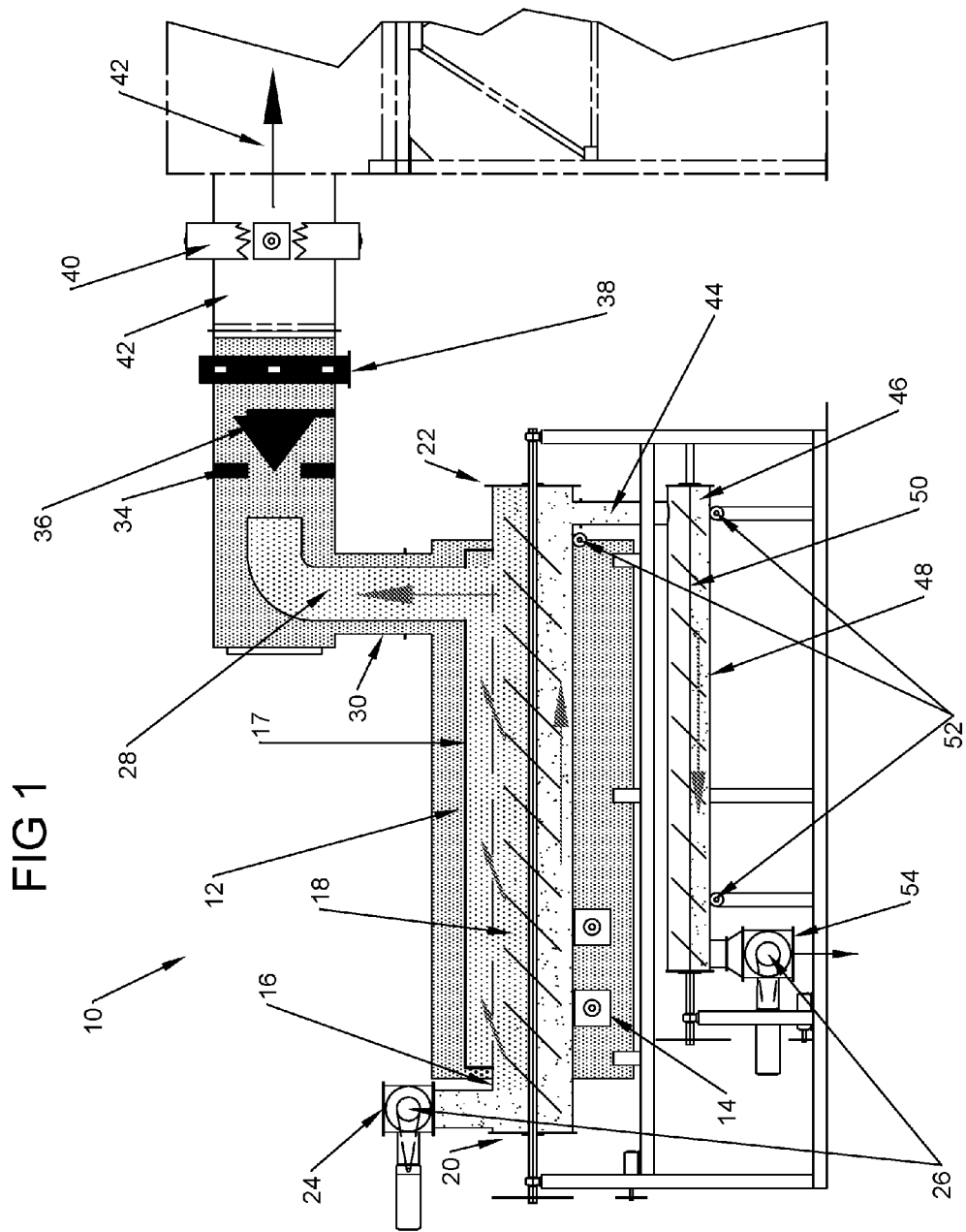
FIG. 1 is a schematic diagram of a pyrolysis unit according to one implementation of the invention.

A pyrolysis unit 10 is shown in FIG. 1. Pyrolysis unit 10 may be used to perform the initial pyrolysis step in a pyrolysis system that includes a thermal oxidizer unit and stack unit (not shown.) As noted above, the pyrolysis unit routes syngas discharge in a manner that reduces maintenance of the unit, routes flue gases in a manner that recovers their heat and eliminates discharge of flue gas to the environment, and includes other features which enhance the commercial viability of the pyrolysis system.

The pyrolysis unit 10 includes a combustion chamber 12, which is made from materials capable of withstanding temperatures of 1200-2600° F. Burners 14 are positioned within the combustion chamber. These burners may be natural gas or propane-fired and are adapted to generate and supply hot combustion gases into the combustion chamber. While two burners are illustrated, more or fewer could be provided.

A main retort 16 is disposed within the combustion chamber 12. Pyrolysis of the feed material takes place in this main retort, producing pyrolysis gases, referred to herein as syngas. The main retort 16 includes slots or other openings (not shown) in its upper surface, which are in fluid communication with a syngas conduit 17. The main retort has a generally cylindrical cross section and contains a conveying element configured to convey a feedstock through the retort, shown in FIG. 1 as screw 18. The main retort 16 has a feed end 20 and a discharge end 22. The feed end and discharge end of the retort extend through the proximal and distal ends, respectively, of the combustion chamber 12. The screw 18 is adapted to be axially rotated to move material from the feed end to the discharge end of the retort.

Feedstock is delivered to the main retort at the feed end 20. If the feedstock is a solid material such as, for example, pieces of shredded tire rubber, the feedstock is fed into a solid inlet 24, which may have a funnel (not shown) to retain the feedstock and direct it into an airlock 26. The funnel may include a level sensor to regulate delivery of feedstock to the main retort for enhanced process control. The pyrolysis unit may also include a liquid feed (not shown). Airlock 26 regulates delivery of the feedstock into the main retort and is adapted to prevent or minimize the admission of oxygen into the main retort. The structure of a suitable airlock is described in detail in U.S. Pat. No. 6,758,150.

As the rotating screw 18 conveys the feedstock along the length of the main retort 16 in the direction of the arrow in FIG. 1, the feedstock is subjected to the heat from the burners 14 and to hot combustion gases swirling about the main retort, pyrolyzing the material and generating syngas.

This syngas is exhausted (vertical arrow, FIG. 1) through a syngas relief duct 28 in sealed fluid communication with the outlet of the syngas conduit 17. The syngas relief duct is maintained at a negative pressure to draw syngas from the main retort. The syngas relief duct 28 extends vertically from the main retort, and is preferably disposed generally perpendicular (within +/−10 degrees of perpendicular) to a horizontal plane taken through the long axis of main retort, as shown. While it is preferred that the syngas relief duct be generally perpendicular to the axis, in some implementations it can be within +/−45 degrees, e.g., within +/−20 degrees of vertical. The syngas relief duct 28 is disposed within a flue gas relief duct 30 that is in sealed fluid communication with the combustion chamber 12. The hot flue gases in the combustion chamber, generated by burners 14, are exhausted from the combustion chamber through the flue gas relief duct 30, keeping the syngas warm as it travels through the syngas relief duct 28. The temperature of the flue gas and the syngas in their respective chambers is relatively close to the temperature of these gases in the combustion chamber, e.g., within +/−25° F. This reduces or eliminates the formation of solid residue ("clinker") in the syngas relief duct, minimizing maintenance. The generally vertical position of the syngas relief duct also helps to keep the duct clear by causing any fines to drop back into the main retort rather than being trapped in the duct.

The clearance between the walls of the two ducts, and the volumes of the ducts, is selected to maintain a flow rate of from about 30 to 60 feet/sec for both gases.

The flue gas then flows into a mixing chamber 32 where it mixes with the syngas, rather than being exhausted to atmosphere. As a result, the heat energy from the flue gas is recovered, enhancing the energy yield of the system. Moreover, emission of hot gases, and potentially particulate, from the pyrolysis unit to the environment is eliminated, improving environmental compliance of the system.

Mixing of the syngas and flue gas is assisted by a mixing baffle 34, after which the gaseous mixture is distributed outwardly by a distribution cone 36. Distribution cone 36 forces the mixture outwardly within the mixing chamber as the mixture flows past combustion air inlet 38. As it passes the combustion air inlet, the syngas/flue gas mixture is further mixed with combustion air. The mixture of the three gases then enters thermal oxidizer chamber 42 where it passes through afterburner burners 40. This routing of the gas mixture causes the mixture to pass through the afterburner burners, igniting the gases. The combustion air inlet 38 is preferably positioned just upstream of the afterburner burners 40, as shown, rather than further upstream, to prevent pre-ignition of the gases. In some embodiments, the combustion air inlet is in the form of a ring surrounding the chamber 42.

Figure 2:
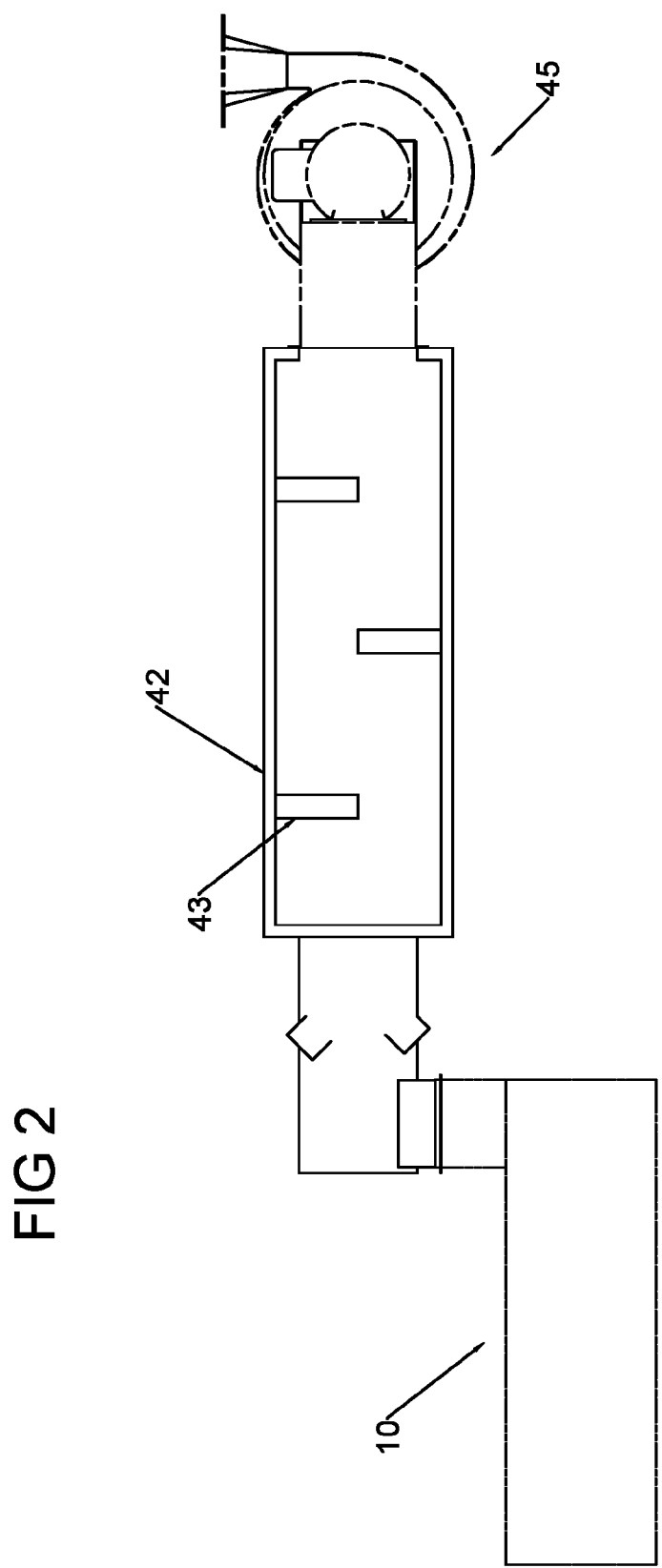
FIG. 2 is a schematic diagram of an expansion chamber in fluid communication with the pyrolysis unit shown in FIG. 1.

Referring to FIG. 2, after passing through the afterburner burners 40, the gas mixture flows into an afterburner expansion chamber 42 which includes a plurality of mixing baffles 43 which tumble and mix the gas, giving the gas time to be completely or substantially completely combusted and thereby reducing emissions from the system. The gas mixture then travels through a blower 45, which imposes a negative pressure on the thermal oxidizer chamber and combustion air inlet, and may be exhausted to a stack. In some implementations, the pyrolysis system may include an apparatus for recovering energy from the syngas and flue gas. For example, the discharge from the thermal oxidizer unit may be supplied to a boiler where water is heated to produce steam. This and other methods of heat recovery from pyrolysis are well known, and are discussed, e.g., in U.S. Pat. No. 6,758,150.

The solid material that remains after pyrolysis of the feedstock in the main retort (carbon char) falls though a conduit 44 at the discharge end of the main retort into the feed end 46 of a secondary retort 48, which is disposed outside of the combustion chamber 12 and directly below the main retort. As it passes through the secondary retort 48, conveyed by a screw 50, the solid material cools, allowing it to be safely exhausted without danger of ignition. Some further pyrolysis may also take place in the secondary retort, due to residual heat in the solid material.

To provide for thermal expansion of the conduit 44, and for relative movement between the main retort 16 and secondary retort 48 due to differential thermal expansion, thermal expansion rollers 52 may be provided both at the end of the main retort adjacent the transition to the secondary retort and below and supporting the secondary retort, as shown. These thermal expansion rollers provide for a degree of vertical and lateral movement between the main and secondary retort segments. The thermal expansion rollers are supported on a framework (not shown.)

Near the discharge end of the secondary retort is a discharge 54 including a discharge airlock 26. Material conveyed to the discharge 54 by the screw 50 is discharged from the pyrolysis unit 10 through the airlock 26 into a suitable container. The length of the secondary retort is selected so that by the time the solid material is discharged pyrolysis of the material is substantially complete and the material has cooled, preferably to a temperature of less than about 220° F.

Various sensors may be provided to control the operation of the pyrolysis system, as is well known.

The systems and methods disclosed herein are adapted to destroy most forms of organic waste material, e.g., solid waste, liquid waste, hazardous waste, industrial wastes, and all forms of volatile organic compounds (VOCs). The systems and methods can be used to process hydrocarbons, PCB's, rubber, chlorides, herbicides, pesticides, plastics, wood and paper. The pyrolysis process breaks down the waste material into gas and carbon char. The carbon char may be recycled for use in any application that utilizes carbon, for example in inks or paints, as activated carbon, in tires, and many other products.

Other Embodiments

A number of embodiments have been described. Nevertheless, it will be understood that various modifications may be made without departing from the spirit and scope of the disclosure. Accordingly, other embodiments are within the scope of the following claims.

What is claimed is:

1. A pyrolysis device comprising:
a combustion chamber containing one or more burners configured to generate hot flue gases;
a main retort, disposed within the combustion chamber, configured to at least partially pyrolyze a feedstock delivered to the retort, thereby generating syngas;
a syngas relief conduit, into which syngas flows from the main retort;
a flue gas relief duct, into which flue gas is exhausted from the combustion chamber, the flue gas relief duct being separate from the combustion chamber and having a first end in sealing fluid communication with the combustion chamber;
wherein the syngas relief duct is disposed within the flue gas relief duct; and
a mixing chamber, into which the syngas flows from the syngas relief duct and the flue gas flows from the flue gas relief duct.

2. The device of claim 1 further comprising a mixing baffle and distribution cone within the mixing chamber, configured to direct gas outwardly within the mixing chamber.

3. The device of claim 2 further comprising a combustion gas inlet and an afterburner element positioned downstream of the distribution cone.

4. The device of claim 1 further comprising a secondary retort in fluid communication with the retort and configured to receive solid residues from the main retort.

5. The device of claim 4 wherein the secondary retort is mounted on expansion rollers to allow relative movement of the main retort and secondary retort.

6. The device of claim 5 wherein the secondary retort and main retort are connected by a rigid conduit.

7. The device of claim 1 further comprising a thermal oxidizer chamber in fluid communication with the mixing chamber, and an afterburner system disposed within the thermal oxidizer chamber.

8. The device of claim 1 wherein, during use, the temperature of the gases within the flue gas relief duct and the syngas relief duct is within +/−25 degrees F. of the temperature of the flue gas and syngas in the combustion chamber and main retort, respectively.

9. The device of claim 7 further comprising an expansion chamber in fluid communication with the thermal oxidizer chamber.

10. The device of claim 9 further comprising a plurality of mixing baffles disposed within the expansion chamber.

11. The device of claim 9 further comprising, downstream of the expansion chamber, a blower configured to draw a vacuum on the expansion chamber, thermal oxidizer chamber, and mixing chamber.

12. The device of claim 1 wherein the clearance between an outer wall of the syngas relief duct and an inner wall of the flue gas relief duct is selected such that the flow rate of the gases within the ducts is from about 30 to 60 feet/second.

* * * * *